April 6, 1948.  G. N. STRIKE  2,439,110

VALVE

Filed Sept. 14, 1944

INVENTOR.
George N. Strike
BY Carlos G. Stratton
ATTORNEY

Patented Apr. 6, 1948

2,439,110

UNITED STATES PATENT OFFICE 2,439,110

VALVE

George N. Strike, Los Angeles, Calif.

Application September 14, 1944, Serial No. 553,982

4 Claims. (Cl. 251—27)

My invention relates to a valve, and an object of the invention is to provide a valve whose closure member will seat in different positions, to minimize the wear upon any single portion of the valve-closing surface of the closure member.

Another object is to provide a rotary valve closure means that is adapted to close the valve in any position around its circumference.

A further object is to provide a rotary closure member mounted to be turned by the flow of liquid through the valve, whereby the member reseats itself in different positions from time to time.

My invention also has for its object to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
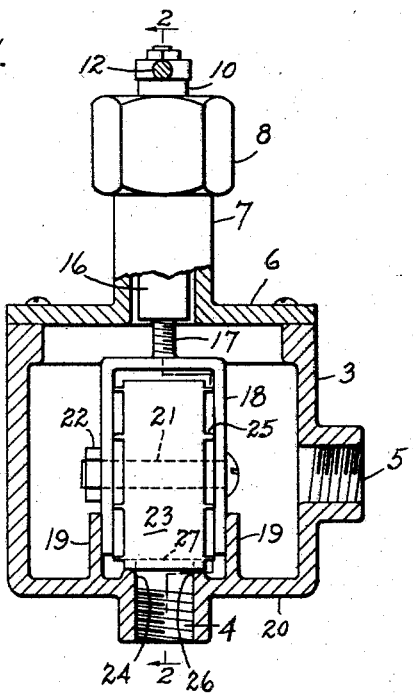
Fig. 1 is a vertical section, partly in elevation, of a valve embodying the foregoing objects.

Referring more in detail to the drawings, reference number 3 generally designates a housing having an inlet 4 and an outlet 5. A cover 6, bolted upon the housing, carries a neck 7 that is threaded at its upper end, as shown in the drawings.

Screwed upon the threaded end of the neck 7 is a packing gland 8. A packing 9 within the gland 8 is compressed around a stem 10. A handle 12 is connected to rotate the stem 10 within the neck 7. A circumferential flange 13 on the stem 10 is arranged between a shoulder 14 on the outer end of the neck 7 and a tapered packing ring 15 that tends to thrust the packing toward the stem 10.

The lower end 16 of the stem 10 is internally threaded to receive a threaded pin 17 mounted upon a yoke 18. The yoke is arranged to slide vertically, as it is shown in the drawings, between fixed plates 19 on a side 20 of the housing 3. The plates 19 prevent the yoke 18 from turning within the stem 10, 16.

Figure 2:
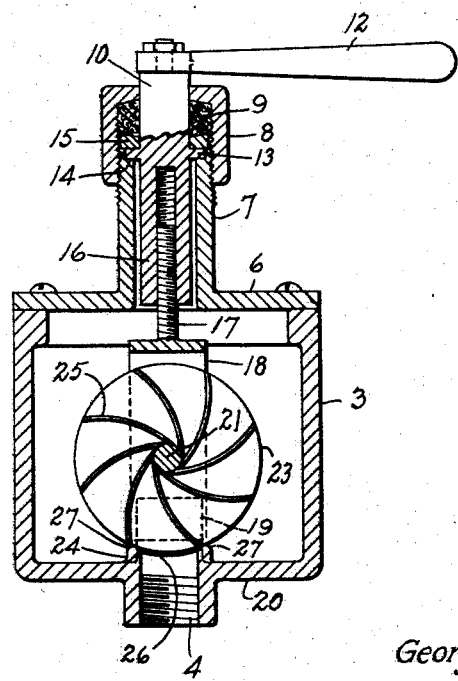
Fig. 2 is a vertical section, taken on the line 2—2 of Fig. 1, looking in the direction of the arrows.

The yoke carries a stub shaft 21, which is in the form of a bolt with a nut 22 fastening same in place. A wheel 23 is rotatably mounted within the yoke 18 on the stub shaft. The inlet 4 has a lip 24 at its inner end which provides a seat for the perimeter of the wheel 23. The lip 24 is preferably dished on its upper edge, as suggested at 26 in the drawings, to conform with the curved contour of the wheel, when looking at the side of the wheel, as shown in Fig. 2. The broken lines 27 in Fig. 1 and the full lines 27 in Fig. 2 show the higher portions of the lip 24.

One or both of the sides of the wheel 23 has a series of curved vanes 25 that extend generally from the shaft 21 outward to the curved face of the wheel. These vanes act as impellers to catch liquid passing through the housing 3, in order to rotate the wheel 23. These vanes afford positive means to insure rotation of the wheel, so that it will engage the seat 24 with different portions of the circumference of the wheel.

In the operation of my present invention, turning the handle 12 one way or the other causes the closure member 23 to move to or from its seat engaging position to shut off or permit the flow of liquid through the valve to the outlet 5. The liquid may flow either way through the housing 3; i. e., from port 5 to port 4 and vice versa. In either event, the liquid impinges upon the vanes 25 and causes the closure member to turn to present a new circumferential portion to the lip or seat 24.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a valve, a housing having an inlet and an outlet, means providing a valve seat in the housing, a rotary closure member connected to be moved to and from a position in engagement with the seat, a yoke supporting the closure member opposite the seat in a manner permitting such member to rotate freely within the yoke, manual means for controlling the valve, a threaded connection between the manual means and the yoke, the threaded connection being arranged to move the closure member to and from a seat-engaging position by relative movement of the manual means, means arranged to prevent the yoke from following the relative movement of the manual means but arranged to permit movement of the yoke to and from a valve closing position.

2. In a valve, a housing having an inlet and an outlet, means providing a valve seat in the housing, a rotary closure member connected to be moved to and from a position in engagement with the seat, a yoke supporting the closure member opposite the seat in a manner permitting such member to rotate freely within the yoke, vane means on the closure member arranged to rotate the closure member by the flow of liquid through the valve, manual means for controlling the valve, and a threaded connection between the manual means and the yoke, the threaded connection being arranged to move the closure member to and from a seat-engaging position by relative movement of the manual means, the housing having means arranged to prevent the yoke from following the relative movement of the manual means but arranged to permit movement of the yoke to and from a valve closing position.

3. In a valve, a housing having an outlet and an inlet, a valve seat defining the inlet within said housing, a closure member having vanes and mounted to turn by fluid flowing past the valve seat and said vanes into said housing, a yoke within said housing and rotatably supporting the closure member opposite said valve seat, a rotatably operable means for controlling the movement of said yoke and closure member to valve seating and unseating positions, a threaded connection between the yoke and said operable means, and a guide for said yoke to prevent rotation thereof during the operation of said operable means.

4. In a valve, a housing having an inlet and an outlet, a valve seat defining the inlet within said housing, a yoke within said housing, a vaned closure member journaled in said yoke and operatively associated with the valve seat and rotatable by fluid flow past said seat and said vaned closure member, and means to reciprocate said yoke to move said closure member to seating and unseating positions with respect to the valve seat, said means comprising a threaded member on said yoke and a rotatable manually operable means connected with said threaded member, and guide means to maintain said yoke against rotation during the reciprocation thereof.

GEORGE N. STRIKE.

REFERENCES CITED

The following references are of record in the file of this patent:

UNITED STATES PATENTS

| Number | Name | Date |
|---|---|---|
| 414,509 | Fisher | Nov. 5, 1889 |
| 828,981 | Staaf | Aug. 21, 1906 |
| 2,192,452 | Ostlind | Mar. 5, 1940 |

FOREIGN PATENTS

| Number | Country | Date |
|---|---|---|
| 94,791 | Sweden | 1939 |